2,863,918
STABILIZATION OF ACRYLAMIDE

Norbert M. Bikales, Stamford, and Robert J. Munch, Greenwich, Conn., assignors to American Cyanamid Company, New York, N. Y., a corporation of Maine No Drawing. Application May 21, 1956
Serial No. 585,937

6 Claims. (Cl. 260—561)

This invention relates to unsaturated organic amides. More particularly, it relates to acrylamide and its α-substituted homologs and particularly to the stabilization of solutions of such amides against polymerization.

Acrylamide and its α-substituted homologs and the polymerization and copolymerization products thereof are employed in various fields. Especially are they of importance in such fields as adhesives, dispersants, plasticizers, surface coatings, thickening agents as well as in the leather, paper, textile, and photographic arts. Because of these many potential applications, methods of preparing the monomers are of particular interest.

These monomers are usually prepared by reacting the corresponding acrylonitrile with water and concentrated sulfuric acid. The reaction mixture comprising the amide sulfate is then further treated to separate the free amide. This may be conducted in various ways, one of which comprises treating an aqueous solution of the amide sulfate with an alkaline earth metal hydroxide or carbonate to precipitate an insoluble sulfate. Another procedure comprises treating a solution of the amide sulfate in an organic solvent with ammonia or an alkaline metal hydroxide or carbonate to form the corresponding sulfate which is insoluble in the solvent. An unusually successful procedure particularly adapted for the neutralization of acrylamide sulfate comprises treating an aqueous solution thereof with ammonia under controlled conditions of temperature and hydrogen ion concentration. Under these controlled conditions, the normally water-soluble ammonium sulfate precipitates and may be separated.

In each of these modes of neutralization, the residual liquor is usually treated to recover a crystalline product. Regardless of how the neutralization and crystallization are conducted, elevated temperatures are generally employed at some point in the process which aggravate the problem of premature polymerization existing because the amide is in solution. This problem is still further aggravated in continuous neutralization systems because of the extended residence time within the system of part of the original liquor due to the recycling of amide-bearing streams.

Although the present invention is particularly concerned with the problem of polymerization during the preparation of acrylamide and its homologs, the problem also exists in other situations. Thus, polymerization is also a serious problem in those instances in which it may be desired to store a solution of an amide. Similarly, the problem exists when the amide is employed as an intermediate under conditions favorable for polymerization. It is apparent, therefore, that there are various situations in which stabilization of an amide solution is highly desirable.

It would appear that this problem of premature polymerization could be readily overcome by incorporating in the amide-bearing solution any of known materials which have been suggested as polymerization inhibitors. Many of these materials, however, have been found unsatisfactory for one or more of various reasons. Some satisfactorily inhibit polymerization but discolor the solution and/or are difficult to remove prior to use of the solution for polymerization. Still others have been found to be ineffective as polymerization inhibitors for any extended period of time.

In accordance with the present invention, it has now been found that the polymerization of solutions of acrylamide and its α-substituted homologs can be effectively inhibited for extended periods of time by incorporating therein butylated hydroxyanisole.

The inhibitor of this invention is readily prepared by reacting a mixture of hydroxyanisole with isobutylene. The resultant butylated hydroxyanisole is known and is useful for various purposes. It has found particular use as an edible antioxidant for fats and oils.

The amount of inhibitor employed may vary over a wide range. It has been observed that stabilization is considerably enhanced by employing as little as 10 parts of inhibitor per million parts of amide solution. Usually, however, the amount employed will be greater than this and it may even range to as high as 2,000 p. p. m. Beyond this concentration, however, there is little if any additional stabilization advantage gained. It is a preferred practice in accordance with this invention to employ the inhibitor within a range of about 100–1000 p. p. m.

Aside from exhibiting an unusually effective stabilizing property, inhibitors of this invention have the further advantage in that they do not discolor the amide product and may be easily separated when desired. The inhibitor may be readily removed from the amide product by solvent extraction.

The invention is further illustrated by the following examples. Unless otherwise noted all parts are by weight.

Example 1

A 60% solution of acrylamide in water is prepared from recrystallized acrylamide and distilled water and divided into three equal samples. To one sample employed as a blank, there is nothing added, while to the second and third samples, there is added 200 and 1000 parts, respectively, of butylated hydroxyanisole per million parts of solution. Each sample is then deaerated by freezing, evacuating, thawing and flushing with nitrogen. This procedure is repeated 3 times. The samples are sealed under nitrogen, held in 50° C. and observed for evidence of polymerization. The blank polymerizes in 26 hours. No evidence of polymerization is observed in the two treated samples at the end of 230 hours after which time the test is discontinued.

Example 2

The procedure of Example 1 is followed except that a 60% solution of methacrylamide in water is substituted for the acrylamide solution. Results similar to those of Example 1 are obtained.

We claim:
1. A method of inhibiting the polymerization of a solution of an amide selected from the group consisting of acrylamide and lower α-alkyl acrylamide which comprises incorporating therein t-butyl hydroxyanisole as a polymerization inhibitor.

2. A method according to claim 1 in which the amount of inhibitor is at least 10 parts per million parts of solution.

3. A method according to claim 2 in which the amide is acrylamide and the amount of inhibitor is about 100–1000 parts per million parts of solution.

4. A solution of an amide selected from the group consisting of acrylamide and lower α-alkyl acrylamide stabilized against polymerization containing t-butyl hydroxyanisole as a polymerization inhibitor.

5. A solution according to claim 4 in which the amount of inhibitor is at least 10 parts per million of solution.

6. A solution according to claim 5 in which the amide is acrylamide and the amount of inhibitor is about 100–1000 parts per million parts of solution.

References Cited in the file of this patent

UNITED STATES PATENTS

| | | |
|---|---|---|
| 2,529,838 | Erickson | Nov. 14, 1950 |
| 2,535,245 | Weisberger | Dec. 26, 1950 |
| 2,683,741 | Wiley | July 13, 1954 |
| 2,749,355 | Jones | July 5, 1956 |